Figure 1:
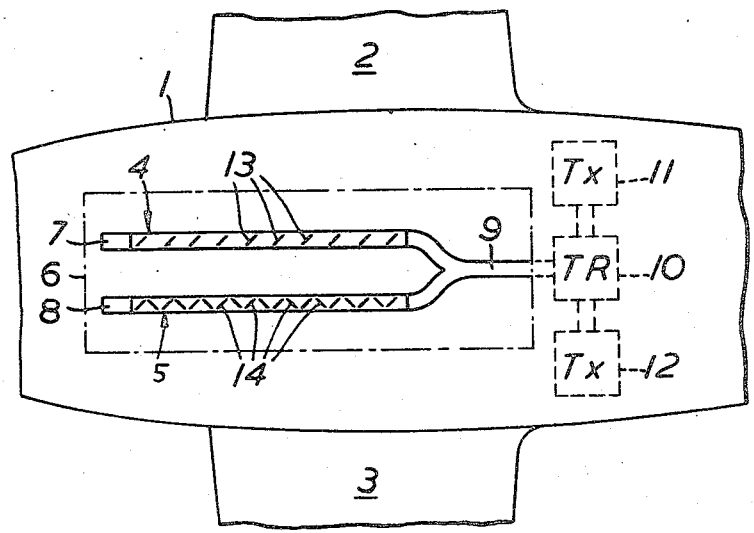

United States Patent Office 2,834,014
Patented May 6, 1958

2,834,014

AERIAL SYSTEMS

Thomas George Thorne, Malvern, England, assignor to Minister of Supply in His Majesty's Government of the United Kingdom of Great Britain and Northern Ireland, London, England Application February 16, 1951, Serial No. 211,208

Claims priority, application Great Britain February 16, 1950

8 Claims. (Cl. 343—771)

The present invention relates to aerial systems and more particularly to aerial systems for airborne radio navigational apparatus.

A method is known of finding the velocity of an aircraft by measuring the Doppler beat frequency produced when reflected ground signals, from a transmitter in the aircraft, received with a forward looking aerial are mixed with those received with a backward looking aerial. If $\theta_1$ and $\theta_2$ are the angles from the vertical of the forward and backward beams, the beat frequency $f_B$ is given by the equation $$f_B = \frac{2v}{\lambda}(\sin\theta_1 + \sin\theta_2) \tag{1}$$

where $v$ is the horizontal velocity of the aircraft and $\lambda$ is the wavelength of the transmitter.

The most suitable polar diagram for the aerial array of such a system is the conical beam produced by a horizontal linear array and for the reflected signals to be large compared with the inherent noise of the receiver, when flying over relatively smooth sea, both forward and backward beams have to be depressed until the angle of the beams from the vertical plane at right angles to the array is approximately 30°.

Since the beam of a linear array moves when there is either a frequency change, or a change in temperature resulting in an alteration of the dimensions of the array, it is important to consider the resultant effect in such a system on the indicated velocity, which is directly proportional to the Doppler beat frequency.

*Aerial system with linear arrays of antiphased radiating elements*

The angle of the main beam from the plane normal to an array in which adjacent radiating elements are reversed in phase is given by the equation $$\sin\theta = \sin\alpha + (n-\tfrac{1}{2})\lambda/S \tag{2}$$

where $\cos\alpha = \lambda/2a$
$S$ = spacing of radiating elements
$n$ = 0, ±1, ±2, etc.

$a$ = resonant dimension of the waveguide of the linear array
$\lambda$ = wavelength of the transmitter When the spacing of the elements is such that only $n=0$ gives a solution to Equation 2, there is only one main beam and $$\sin\theta = \sin\alpha - \lambda/2S \tag{3}$$

With identical forward and backward looking arrays the Doppler beat frequency is given by the equation $$f_B = \frac{4v}{\lambda}\sin\theta$$

$$= 4v/\lambda(\lambda 2S - \sin\alpha) \text{ when the signs}$$
are reversed to make $f_B$ positive $$= \frac{2v}{cS}\{c - 2S(f^2 - c^2/4a^2)^{1/2}\} \tag{4}$$

where $f$ = frequency of the transmitter
$c$ = speed of propagation of radio waves

*Effect of change of transmitter frequency on the Doppler beat frequency*

The fractional change of Doppler beat frequency with transmitter frequency is $$\frac{1}{f_B}\cdot\frac{df_B}{df} = \frac{cS}{2v\{c-2S(f^2-c^2/4a^2)^{1/2}\}}\times\frac{2v}{cS}\times\frac{-2Sf}{(f^2-c^2/4a^2)^{1/2}}$$

$$= \frac{-2Sf}{c(f^2-c^2/4a^2)^{1/2} - 2S(f^2-c^2/4a^2)}$$

$$= \frac{-1}{(f^2-\tfrac{3}{4}f^2)^{1/2} - (f^2-\tfrac{3}{4}f^2)} = \frac{-4}{f} \tag{5}$$

when $S=\lambda/2$, and $\theta=30°$

*Effect of change of temperature*

Assuming the aerial system is of the type comprising a plurality of radiators distributed along a waveguide, a change of temperature will result in a variation of the resonant dimension of the guide $a$ and in the spacing of the radiating elements $S$. The effect of this on the Doppler beat frequency is given by the following equation, where $\beta$ is the linear coefficient of expansion of the waveguide metal and $t$ is the temperature.

$$f_B = \frac{2v}{cS(1+\beta t)}\left[c - 2S(1+\beta t)\left\{f^2 - \frac{c^2}{4a^2(1+\beta t)^2}\right\}^{1/2}\right] \tag{6}$$

The fractional change of $f_B$ with temperature is $$\frac{1}{f_B}\cdot\frac{df_B}{dt} = \frac{cS(1+\beta t)}{2v[c-2S\{f^2(1+\beta t)^2 - c^2/4a^2\}^{1/2}]}$$

$$\times\frac{2v}{cS}\frac{\left[(1+\beta t)\frac{-2Sf^2\beta(1+\beta t)}{\{f^2(1+\beta t)^2-c^2/4a^2\}^{1/2}} - \beta[c-2S\{f^2(1+\beta t)^2-c^2/4a^2\}^{1/2}]\right]}{(1+\beta t)^2}$$

$$= \frac{-\beta}{(1+\beta t)[c-2S\{f^2(1+\beta t)^2-c^2/4a^2\}^{1/2}]}\left[\frac{2Sf^2(1+\beta t)^2}{\{f^2(1+\beta t)^2-c^2/4a^2\}^{1/2}} + \left[c - 2S\left\{f^2(1+\beta t)^2 - \frac{c^2}{4a^2}\right\}^{1/2}\right]\right]$$

$$= \frac{+\beta}{(1+\beta t)}\left[\frac{2Sf^2(1+\beta t)^2}{c\{f^2(1+\beta t^2-c^2/4a^2\}^{1/2} - 2S\{f^2(1+\beta t)^2-c^2/4a^2\}} + 1\right] \tag{7}$$

$$\doteq -\beta\left[\frac{2Sf^2}{c\{f^2-c^2/4a^2\}^{1/2} - 2S\{f^2-c^2/4a^2\}} + 1\right]$$

$$\doteq -5\beta \text{ when } S=\lambda/2 \text{ and } \theta=30°$$

Aerial system with linear arrays of phased radiating elements

A linear array having radiating elements of the same phase has a main beam at an angle of $\theta$ from the normal to the array where $$\sin \theta = \sin \alpha - \frac{n\lambda}{S} \qquad (8)$$

When the spacing is such that only $n=0$ gives a solution, there is only one main beam and $$\sin \theta = \sin \alpha \qquad (9)$$

With an aerial system that has identical linear arrays for forward and backward looking $$f_B = 4v/\lambda \sin \theta$$
$$= 4v/c \ (f^2 - c^2/4a^2)^{1/2} \qquad (10)$$

Effect of change of transmitter frequency on Doppler beat frequency

The fractional change of $f_B$ with transmitter frequency is $$\frac{1}{f_B} \cdot \frac{df_B}{df} = \frac{c}{4v(f^2-c^2/4a^2)^{1/2}} \cdot \frac{4v}{c} \cdot \frac{f}{(f^2-c^2/4a^2)^{1/2}}$$

$$= \frac{f}{(f^2-c^2/4a^2)} \qquad (11)$$

$$= 4/f \text{ when } \theta = 30°$$

It will be noted that this is the same magnitude as that obtained with antiphased arrays above discussed but of the opposite sign.

Effect of temperature changes

The effect of a change of temperature $t$ on the value of $f_B$ in this case is given by the equation, $$f_B = \frac{4v}{c}\left[\frac{\{f^2(1+\beta t)^2 - c^2/4a^2\}^{1/2}}{(1+\beta t)}\right] \qquad (12)$$

The fractional change of $f_B$ with $t$ is $$1/f_B \cdot \frac{df_B}{dt} = \frac{c}{4v}\left[\frac{(1+\beta t)}{\{f^2(1+\beta t)-c^2/4a^2\}^{1/2}}\right] \times \frac{\frac{4v}{c}\left[\frac{(1+\beta t)\beta f^2(1+\beta t)}{\{f^2(1+\beta t)^2-c^2/4a^2\}^{1/2}} - \beta\{f^2(1+\beta t)^2-c^2/4a^2\}^{1/2}\right]}{(1+\beta t)^2}$$

$$= \frac{\beta}{(1+\beta t)}\left[\frac{f^2(1+\beta t)^2}{\{f^2(1+\beta t)^2-c^2/4a^2\}} - 1\right]$$

$$= \frac{\beta}{(1+\beta t)}\left[\frac{c^2/4a^2}{\{f^2(1+\beta t)^2-c^2/4a^2\}}\right]$$

$$\doteq 3\beta \qquad (13)$$

when $\theta = 30°$

Although the change of $f_B$ with temperature is less than that with antiphased linear arrays it is still quite appreciable.

The above desiderata provide the basis for an expedient which may be adopted according to this invention to provide an aerial system of the type and for the purpose described, in which the effect of changes in the transmitter frequency and/or in ambient temperature upon the velocity indicated by the measured Doppler beat frequency may be reduced or eliminated.

According to this invention therefore, there is provided an aerial system for the purpose described comprising two linear arrays of radiating elements each adapted to provide a beamed radiation and reception pattern the direction of maximum response of which is inclined at an angle to the direction of the linear array, the adjacent radiant elements of one of which arrays are fed in the same phase and the adjacent radiant elements of the other of which are fed alternately in opposite phases whereby changes in operative frequency produce changes in the directions of maximum response of the directivity patterns of the two arrays such that the Doppler beat frequency tends to remain constant independently of frequency variation in the energy supply to said aerial arrays.

According to a feature of the invention the two aerial arrays are mounted on supports of dissimilar materials having different coefficients of thermal expansion whereby the arrays are tilted with respect to one another under the influence of temperature changes in the appropriate sense to offset changes in the Doppler beat frequency which would otherwise occur due to the effect of thermal expansion and contraction of the arrays consequent on said temperature changes.

According to a further feature of the invention the two aerial arrays are made of dissimilar materials having different coefficients of thermal expansion, whereby changes in the Doppler beat frequency obtained in the system due to the effects of temperature changes in the directivity patterns of the two arrays are reduced.

In carrying out the invention in its application to a navigational system of the kind above referred to, two aerial arrays are provided on the aircraft, one of which comprises a linear array of radiating elements (e. g. slot radiators in the wall of a waveguide) each of which is coupled to a feed waveguide in the same phase as its neighbours, and which provides a directivity pattern beamed in a direction looking, say, forwardly of the aircraft at an angle depressed through 30° from the horizontal (assuming the aircraft to be flying on an even keel). The other array comprises a similar linear array of radiating elements each arranged to be coupled to the feed waveguide in antiphase to its neighbours and providing a directivity pattern beamed in the opposite direction (in the example backwardly of the aircraft) to the first array and likewise depressed through 30° from the horizontal (again assuming the aircraft to be on an even keel). Both arrays may take the form of a length of waveguide having slot radiators cut in one wall in known manner.

From the above analysis it will be seen that, using such an array, there will be obtained from the velocity measuring system a Doppler beat frequency of $$f_B = \frac{2v}{\lambda} \sin \alpha + \frac{2v}{\lambda}(\lambda/2S - \sin \alpha)$$

$$= v/S \qquad (14)$$

Effect of change of temperature

The effect of change of temperature on the Doppler beat frequency when the aerial system above described is used is given by $$f_B = \frac{1}{S(1+\beta t)} \qquad (15)$$

The fractional change of $f_B$ with $t$ is $$\frac{1}{f_B} \cdot \frac{df_B}{dt} = \frac{S(1+\beta t)}{v} \times \frac{-\beta}{(1+\beta t)^2}$$

$$= \frac{-\beta}{(1+\beta t)} \qquad (16)$$

$$\doteq -\beta$$

It will be seen that this is much less than the factor given above for either of the two component types of aerial array used alone. However, the effect of temperature variation may be still further reduced if the two aerial arrays are made of materials of dissimilar coefficients of thermal expansion say $\beta_1$, and $\beta_2$. For example, as above described, for an aerial array in which the angle between the beam and the normal is 30° the fractional change of beat frequency with temperature in the case of the antiphase array is approximately $-5\beta$. In the case of the phased array it is approximately $+3\beta$. If, therefore, the antiphased array is made of the material of coefficient of thermal expansion $\beta_1$ and the phased array of the material of coefficient of thermal expansion $\beta_2$, the two fractional changes are, respectively, $-5\beta_1$, and $+3\beta_2$. If $\beta_1$ is less than $\beta_2$ the result will be a reduction in the overall fractional change produced by the combined array and the effects of temperature variation will be completely removed if $$\frac{\beta_1}{\beta_2}=\frac{3}{5}$$

Another method of reducing or eliminating the effect of temperature variations is to mount one or both of the aerials on supports at their two ends, the supports being of dissimilar materials having different coefficients of thermal expansion such that as the temperature varies the aerials are tilted relative to one another so as to offset the change in directivity of the aerials due to the temperature change to an extent sufficient to maintain the resultant Doppler beat frequency substantially constant.

The accompanying drawings illustrate a practical embodiment of the invention. In the drawings:

Fig. 1 is a partial underneath view, and

Figure 2:
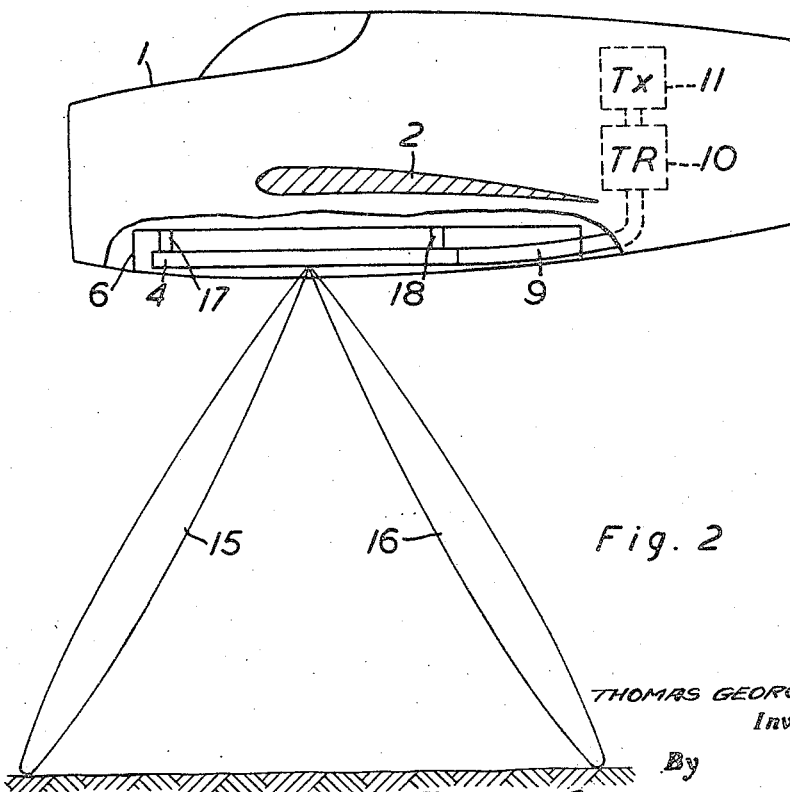

Fig. 2 a partial elevation view, partly broken away, of an aircraft carrying an aerial installation according to the invention, both figures being partly schematic.

In the drawings 1 is part of the fuselage of the aircraft and 2 and 3 the wings shown broken off in Fig. 1 and sectioned in Fig. 2. The aerial installation comprises a pair of waveguides 4, 5 lying side by side and extending in the fore and aft direction of the aircraft, housed in a compartment 6 formed in the belly of the aircraft.

The waveguides are terminated at one end by matched loads indicated at 7 and 8 and at their other end connect to a common feed waveguide 9 which connects to a switch box 10 which enables the aerials to be used both for transmitting and receiving (sometimes called a "common T and R box"). A transmitter 11 and receiver 12 are coupled to the switch box 10.

The waveguides 4 and 5 constitute the two aerials employed according to this invention and are of the form comprising slot radiators suitably spaced along the waveguides in known manner to provide a beam radiation (or reception) pattern. The slot radiators in waveguide 4 are shown at 13 and are all inclined in the same direction to the longitudinal axis of the waveguide, whereby they are all excited in the same phase whereas the slot radiators 14 provided in waveguide 5 are alternately inclined in opposite directions to the waveguide longitudinal axis, whereby alternate radiators are excited in opposite phases.

The spacing of the slot radiators 13 in waveguide 4 is so chosen in relation to the operative wavelength in the waveguide that the resultant radiation (or reception) pattern is in the form of a narrow beam looking forwardly of the aircraft at an angle below the horizontal of approximately 60° while the radiators 14 in waveguide 5 are so spaced as to produce a directivity pattern in the form of a narrow beam looking backwardly of the aircraft and depressed from the horizontal through a similar angle. The two directivity patterns are indicated diagrammatically at 15 and 16 in Fig. 2. The design and construction of such aerials is well known in the art but reference may be had to the Journal of the Institution of Electrical Engineers, vol. 93, part IIIa, No. 1, 1946, page 43, in which some properties of this type of aerial are discussed.

It will be understood, of course, that other types of aerial may equally well be used; for example linear arrays of dipole radiators designed for broadside directivity patterns are well known as analogues of the slot radiator arrays of the type above discussed.

As has been mentioned above the effects of temperature variations on the direction of maximum aerial response in a system of the above described type may be still further reduced by employing waveguides of dissimilar metals having different coefficients of expansion. For example, the waveguide 4 may be made of aluminium and the waveguide 5 of copper so that the greater coefficient of expansion of aluminium will offset the smaller fractional change in the beat frequency produced by length variations of the in-phase array.

As above mentioned, the effect of temperature variations may alternatively be reduced by arranging for the waveguide arrays to be tilted with respect to one another by variations in temperature. Accordingly in the arrangement shown, as can be seen in Fig. 2, the waveguide 4 is mounted on supporting pillars 17 and 18 and these pillars are made of dissimilar metals. The tilting required is such as will increase the angle separating the two beams 15 and 16 as the temperature increases. Thus, if the pillar 17 is made of copper and the pillar 18 of aluminium, the greater expansion of the aluminium pillar 18 will tilt waveguide 4 in a clockwise sense thus swinging the beam 15 clockwise and increasing the angle between the beams 15 and 16 as the temperature rises.

Alternatively, or in addition, the waveguide 5 may be mounted on an aluminium supporting pillar at its forward end and a copper pillar at its rearward end so that it will be tilted anti-clockwise with rising temperature, thus swinging the beam 16 anticlockwise.

By suitably choosing the lengths and positions of the supporting pillars the tilting of either or both of the waveguides produced by changes in temperature may be made to offset the swinging of the beams produced by linear expansion of the waveguides so that a constant beat frequency is obtained despite changes in temperature.

I claim:

1. An aerial system for airborne radio navigational apparatus in which the velocity of an aircraft is found by measuring the Doppler beat frequency produced when reflected ground signals from a transmitter in the aircraft received with a forward-looking aerial are mixed with those received with a backward-looking aerial, comprising two linear arrays of radiating elements one adapted to provide a radiation and reception pattern beamed in a direction downwardly and forwardly of the aircraft, the other adapted to provide a radiation and reception pattern beamed in a direction downwardly and rearwardly of the aircraft, a feed channel coupled to said arrays, one of said arrays having its radiant elements coupled to said feed channel for in-phase energisation of adjacent elements the other of said arrays having its radiant elements coupled to said channel for anti-phase energisation of alternate adjacent elements.

2. An aerial system for airborne radio navigational apparatus in which the velocity of an aircraft is found by measuring the Doppler beat frequency produced when reflected ground signals from a transmitter in the aircraft received with a forward-looking aerial are mixed with those received with a backward-looking aerial, comprising a pair of aerial waveguides coupled to a feed waveguide, a plurality of radiant elements forming a linear array coupled in inphase-wise energy transference to one of said aerial waveguides to provide a response pattern beamed in a direction downwardly and forwardly of the aircraft, and a plurality of radiant elements forming a linear array coupled alternately in antiphase-wise energy transference to the other of said aerial waveguides to provide a response pattern beamed in a direction downwardly and rearwardly of the aircraft.

3. An aerial system for airborne radio navigational apparatus in which the velocity of an aircraft is found by measuring the Doppler beat frequency produced when reflected ground signals from a transmitter in the aircraft received with a forward-looking aerial are mixed with those received with a backward-looking aerial, comprising a slotted waveguide forming a linear aerial array having a directivity pattern beamed in a direction downwardly and forwardly of the aircraft, a slotted waveguide forming a linear aerial array having a directivity pattern beamed in a direction downwardly and rearwardly of the aircraft, one of said slotted waveguides having its slots coupling to the waveguide each in corresponding phase to its adjacent slots, the other of said slotted waveguides having its slots coupling to the waveguide each in antiphase relation to its adjacent slots.

4. An aerial system for airborne radio navigational apparatus in which the velocity of an aircraft is found by measuring the Doppler beat frequency produced when reflected ground signals from a transmitter in the aircraft received with a forward-looking aerial are mixed with those received with a backward-looking aerial, comprising a slotted waveguide forming a linear aerial array having a directivity pattern beamed in a direction downwardly and forwardly of the aircraft, a slotted waveguide forming a linear aerial array having a directivity pattern beamed in a direction downwardly and rearwardly of the aircraft, the slots in one of said waveguides being inclined to the axis of the waveguide all in the same sense and the slots in the other of said waveguides being inclined to the axis of the waveguide in alternately opposite senses.

5. An aerial system for airborne radio navigational apparatus in which the velocity of an aircraft is found by measuring the Doppler beat frequency produced when reflected ground signals from a transmitter in the aircraft received with a forward-looking aerial are mixed with those received with a backward-looking aerial, comprising two linear arrays of radiating elements one adapted to provide a radiation and reception pattern beamed in a direction downwardly and forwardly of the aircraft, the other adapted to provide a radiation and reception pattern beamed in a direction downwardly and rearwardly of the aircraft, a feed channel coupled to said arrays one of said arrays having its radiant elements coupled to said feed channel for in-phase energisation of adjacent elements the other of said arrays having its radiant elements coupled to said channel for anti-phase energisation of alternate adjacent elements the in-phase coupled array being made of material of higher coefficient of thermal expansion than the anti-phase coupled array.

6. An aerial system for airborne radio navigational apparatus in which the velocity of an aircraft is found by measuring the Doppler beat frequency produced when reflected ground signals from a transmitter in the aircraft received with a forward-looking aerial are mixed with those received with a backward-looking aerial, comprising two linear arrays of radiating elements one adapted to provide a radiation and reception pattern beamed in a direction downwardly and forwardly of the aircraft, the other adapted to provide a radiation and reception pattern beamed in a direction downwardly and rearwardly of the aircraft, a feed channel coupled to said arrays one of said arrays having its radiant elements coupled to said feed channel for in-phase energisation of adjacent elements the other of said arrays having its radiant elements coupled to said channel for anti-phase energisation of alternate adjacent elements a front mounting and a rear mounting for the array having a forwardly directed beam said front mounting being of material of lower coefficient of thermal expansion than said rear mounting.

7. An aerial system for airborne radio navigational apparatus in which the velocity of an aircraft is found by measuring the Doppler beat frequency produced when reflected ground signals from a transmitter in the aircraft received with a forward-looking aerial are mixed with those received with a backward-looking aerial, comprising a slotted waveguide forming a linear aerial array having a directivity pattern beamed in a direction downwardly and forwardly of the aircraft, a slotted waveguide forming a linear aerial array having a directivity pattern beamed in a direction downwardly and rearwardly of the aircraft, the slots in one of said waveguides being inclined to the axis of the waveguide all in the same sense and the slots in the other of said waveguides being inclined to the axis of the waveguide in alternately opposite senses, the waveguide having its slots inclined to the axis of the waveguide all in the same sense being made of material of higher coefficient of thermal expansion than the other of said waveguides.

8. An aerial system for airborne radio navigational apparatus in which the velocity of an aircraft is found by measuring the Doppler beat frequency produced when reflected ground signals from a transmitter in the aircraft received with a forward-looking aerial are mixed with those received with a backward-looking aerial, comprising a slotted waveguide forming a linear aerial array having a directivity pattern beamed in a direction downwardly and forwardly of the aircraft, a sloted waveguide forming a linear aerial array having a directivity pattern beamed in a direction downwardly and rearwardly of the aircraft, the slots in one of said waveguides being inclined to the axis of the waveguide all in the same sense and the slots in the other of said waveguides being inclined to the axis of the waveguide in alternately opposite senses, a front mounting and a rear mounting for the array having a forwardly directed directivity pattern the front mounting being made of material of lower coefficient of thermal expansion than the rear mounting, a forward mounting and a back mounting for the array having a rearwardly directed directivity pattern, the forward mounting being made of material of higher coefficient of thermal expansion than the back mounting.

No references cited.